(12) United States Patent
Hall et al.

(10) Patent No.: US 6,208,871 B1
(45) Date of Patent: Mar. 27, 2001

(54) METHOD AND APPARATUS FOR PROVIDING A TIME ADJUSTMENT TO A WIRELESS COMMUNICATION SYSTEM

(75) Inventors: Scott Maurice Hall, Fort Worth; Shawn Allison Warner, Keller; Michael Anthony Krzystyniak, Haslet, all of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/032,005

(22) Filed: Feb. 27, 1998

(51) Int. Cl.⁷ .................. P04J 3/06; H04Q 7/30
(52) U.S. Cl. .............. 455/517; 455/13.2; 370/335
(58) Field of Search ................. 455/517, 13.2, 455/456; 370/335

(56) References Cited

U.S. PATENT DOCUMENTS

| | | | |
|---|---|---|---|
| 5,828,662 | * 10/1998 | Jalali et al. | 370/335 |
| 5,872,774 | * 2/1999 | Wheatley, III et al. | 370/335 |
| 5,914,981 | * 6/1999 | Veintimilla | 375/200 |
| 5,943,361 | * 8/1999 | Gilhousen et al. | 375/200 |

* cited by examiner

*Primary Examiner*—Daniel S. Hunter
*Assistant Examiner*—Alan T. Gantt
(74) *Attorney, Agent, or Firm*—Mario J. Donato, Jr.

(57) ABSTRACT

In a wireless communication system including at least a first (101) and a second base transceiver station (201), a method for providing time adjustment to the second base transceiver station (201) is presented. The method includes supplying an identity of the first and second base transceiver station to a mobile station (103), and based on the identity, tracking a first signal from the first base transceiver station (101) and a second signal from the second base transceiver station (201) by the mobile station (103). The method further includes determining a timing adjustment calculation based on a first time offset of the first and a second time offset of the second signal by the mobile station. And finally, the method includes transmitting the timing adjustment calculation to the second base station transceiver (201), the timing adjustment subsequently used to adjust the timing of the second base station transceiver (201).

31 Claims, 6 Drawing Sheets

METHOD AND APPARATUS FOR PROVIDING A TIME ADJUSTMENT TO A WIRELESS COMMUNICATION SYSTEM

FIELD OF THE INVENTION

The present invention relates generally to wireless communication systems and, more particularly, to a method and apparatus for synchronizing timing in a wireless communication system.

BACKGROUND OF THE INVENTION

Communication systems that utilize coded communication signals are known in the art. One such system is a direct sequence code division multiple access (DS-CDMA) cellular communication system, such as set forth in the Telecommunications Industry Association Interim Standard 95A (TIA/IEIA IS-95A) herein after referred to as IS-95A. In accordance with IS-95A, the coded communication signals used in the DS-CDMA system comprise signals that are transmitted in a common 1.25 MHz bandwidth, hence, spread-spectrum, to base sites of the system from communication units, such as mobile or portable radiotelephones, that are communicating in the coverage areas of the base sites. Each 1.25 MHz bandwidth portion of the radio-frequency (RF) spectrum is commonly referred to as a carrier frequency, capable of conveying multiple sync, paging and digital voice channels associated with a CDMA communication signal.

In a cellular communication system, a pair of communication links is established between a mobile station, or subscriber, and a source base transceiver station. As a mobile station moves out of range of the source base transceiver station, the signal quality degrades until one of the pair of the communication links is ultimately broken, or the call "dropped". To avoid loss of the communication links resulting from a dropped call, the communication links are shifted from the source base transceiver station to a target base transceiver station, or from a source sector to a target sector within the source base transceiver station coverage area. This process of making the shift is commonly referred to in the cellular communication area as a handoff process. A handoff may occur during a call in progress (e.g. from a traffic channel to a traffic channel), or during the initial signaling during call set-up.

Handoffs are generally classified into three types; a soft handoff, a softer handoff and a hard handoff. A soft handoff occurs when a mobile communication signal is transferred from a source base transceiver station (BTS) to a target BTS, the BTSs serving different cell coverage areas. The transfer occurs while the mobile station is in communication with both the source and target BTSs. Similarly, a softer handoff occurs when a mobile communication signal is transferred from a source sector to a target sector, both sectors associated with the same base transceiver station. The transfer occurs while the mobile station is in communication with both the source and target sector. During a soft and softer handoff, the mobile communication signal is supported simultaneously by both the source and target until the transfer to the target is complete. A hard handoff may occur when a mobile station is directed to re-tune to a new carrier frequency, and/or the control of resources supporting the mobile communication signal is transferred from a source base station controller to a target CBSC.

In digital cellular systems such as time division multiple access (TDMA) and code division multiple access (COMA) systems, handoffs are generally initiated by a mobile station and are commonly referred to as mobile assisted handoffs (MAHO). CDMA MAHOs are generally initiated by the mobile station based upon measurements of local pilot signals emanating from neighboring BTS sectors and/or BTSs, wherein each pilot signal includes a signal strength measurement Ec/Io (Energy per chip divided by total interference), and an associated short code PN time offset. Each short code PN time offset corresponds to a specific sector in BTS coverage area and is generated via time shifting (also referred to as phase shifting) a predetermined pseudorandom noise sequence from an absolute time offset.

In IS-95 and J-STD-008 CDMA systems, one common pseudorandom noise sequence is utilized. The pseudorandom noise sequence with a bit rate of 1,228,800 bits (chips) per second is time shifted, as measured by chips, to provide an identifiable digital sequence in the communication signal. For example, a PN offset of 1 corresponds to the pseudorandom noise sequence, shifted 64 chips from an absolute time offset, while a PN offset of 2 corresponds to the pseudorandom noise sequence, shifted 128 chips from an absolute time offset. Accordingly, IS-95 requires extremely accurate time synchronization, for example synchronization to within +/−3 usec., at each base site in order to reliably handoff a mobile station communication signal. As a result, base stations typically receive their absolute system time (a.k.a. timing synchronization) via a global positioning satellite (GPS), although other accurate central timing sources such as LORAN-C may be used.

For a variety of reasons, some base stations do not have access to system timing synchronization. These reasons may include GPS outages, customer adversity to using GPS timing, as well as the physical location of the base station. For example, if no GPS is used in a CDMA system, it would be desirable to time synchronize all BTSs to one master BTS. In another example, a base station located in a subway tunnel, without benefit of system timing synchronization provided by line-of-sight access to GPS, is highly unlikely to provide handoff capability for a mobile station communication signal. As a result, in order to provide handoff capability for a mobile station communication signal, supplementary cabling etc. expenses associated with providing access to a GPS receiver, are incurred.

In addition, the use of home base cordless phone systems utilizing DS-CDMA technology pose another type of synchronization problem. Because they are not centrally synchronized via sophisticated synchronization sources such as GPS, it is possible for the short code PN time offsets of adjacent home base transceiver stations to "drift" until they align with each other. Upon alignment, signals transmitted from one home base transceiver station will destructively interfere with the other home base transceiver station and vise versa. Unfortunately, this destructive interference will render one or both of the home base transceiver stations unusable because its associated mobile station will not be able to differentiate between it and the adjacent home base transceiver station.

Therefore, a need exists for a method and apparatus for providing a time adjustment to a wireless communication system.

DETAILED DESCRIPTION OF THE PREFERRED EMBODIMENT

Stated generally, the present invention encompasses a method for providing a time adjustment to a wireless communication system. A time adjustment is provided to a base transceiver station from a mobile station, in order to synchronize the base transceiver station to the wireless communication system reference time. Similarly, using substantially the same methods, a time adjustment is provided to a base transceiver station in a home based cordless phone system for purposes of shifting the timing of the base transceiver station with respect to the timing of neighboring base transceiver stations.

Stated specifically, in a wireless communication system, including at least a first and a second base transceiver station, a method for providing a time adjustment to the second base transceiver station is disclosed. The method includes supplying an identity of the first and second base transceiver station to a mobile station, and subsequently, tracking a first signal from the first base transceiver station and a second signal from the second base transceiver station by the mobile station, based on the identity, to yield a first and second time offset. The method further includes determining a timing adjustment calculation by the mobile station based on the first and second time offset by the mobile station, and then transmitting the timing adjustment calculation to the second base station transceiver.

Further, the present invention encompasses a method for providing wireless communication system synchronization to an unsynchronized base transceiver station in the wireless communication system. The wireless communication system includes at least a first and a second base transceiver station, the first base transceiver station synchronized to a system reference time, and the second base transceiver station unsynchronized to the system reference time, the system reference time including a system reference oscillator frequency and an absolute reference time. The method includes supplying an identity of the first and second base transceiver station to a mobile station, and subsequently tracking a first signal from the first base transceiver station by the mobile station, based on the identity. Additionally, the method includes synchronizing the mobile station to the system reference time via the first signal, and then determining an actual time offset with respect to the absolute reference time, of a second signal from the second base transceiver station by the mobile station. A finally, the method includes synchronizing the second base transceiver station to the system reference time, based on the actual time offset. Also disclosed in the application is a corresponding apparatus for providing wireless communication system synchronization to the second base transceiver station.

Figure 1:
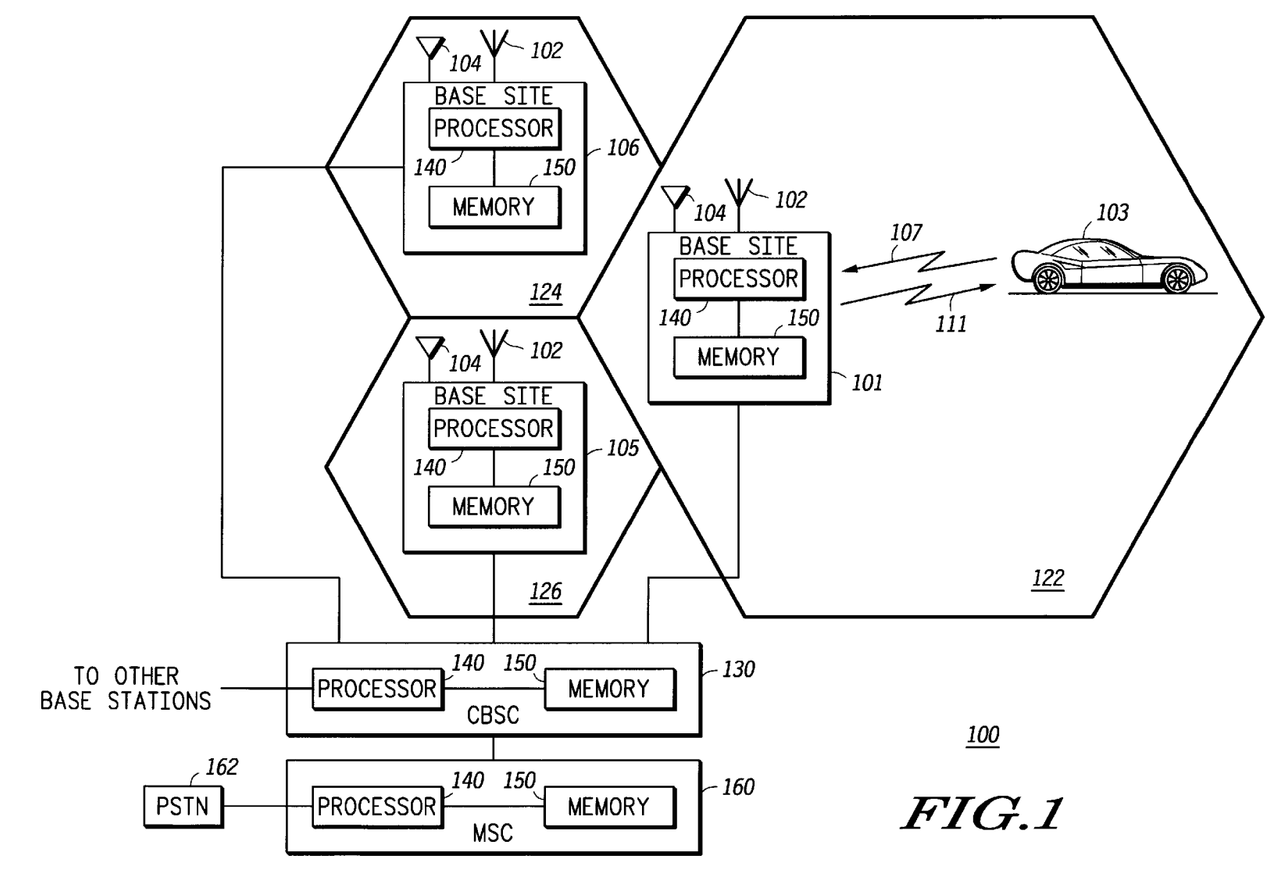
FIG. 1 is a block diagram of a prior art CDMA wireless communication system 100.

Turning now to the drawings, wherein like numerals designate like components, FIG. 1 depicts a typical prior art wireless communication system 100. Communication system 100 preferably comprises a direct sequence code division multiple access (DS-CDMA) cellular communication system, such as that set forth in the Telecommunications Industry Association Interim Standard 95A (TIA IS-95A).

Communication system 100 includes base sites 101, 106, 105 providing service to coverage areas 122, 124, and 126 respectively, and one or more mobile stations although only one mobile station 103 is shown. Base sites 101, 105 and 106 include, among other things, an antenna 102, a processor 140 and a memory 150. Base site 101 includes a transceiver which transmits coded communication signals to, and receives coded communication signals from, mobile station 103 within a coverage area 122 of base site 101. A RAKE receiver within the transceiver provides independent tracking capability of incoming multipath coded communication signals from mobile stations, the construction and operation of RAKE receivers being well known in the art. Similarly, mobile station 103 includes a transceiver which transmits coded communication signals to, and receives coded communication signals from, base site 101 within a coverage area 122.

Base sites 101, 105, and 106 are coupled to a base station controller (BSC) 130, which includes, among other things, a processor 140 and a memory 150, and which is in turn coupled to a mobile switching center 160, also including a processor 140 and a memory 150. Mobile switching center 160 is coupled to the public switched telephone network (PSTN) 162 using known techniques Signals 107 and 111 are conveyed between mobile unit 103 and base site 101 via antenna 102, through a pair of radio frequency (RF) links. The pair of RF links includes a reverse link signal 107 (mobile unit 103 to base site 101) and a forward link signal 111 (base site 101 to mobile unit 103). Reverse link signal 107 includes an identification code or mobile unique pseudo-random long code mask (not shown). This results in a mobile station unique long code associated exclusively with mobile station 103. The mobile station unique long code is subsequently used by a base site RAKE receiver to identify a particular mobile station transmission. Forward link signal 111 includes a pseudorandom noise (PN) short code, offset in time. Although the PN short code is identical for all BTS sectors, the offset in time associated with each BTS sector is selected such that each BTS sector is uniquely identifiable.

A system reference time composed of a system reference oscillating frequency and an associated absolute reference time, is provided to base sites 101, 105, and 106 via global positioning satellite (GPS) receiver antennas 104, in order to provide the required timing synchronization to wireless communication system 100. CDMA timing is referenced to the start of GPS time; Jan. 6, 1980 and 12:00:00 am. Each BTS sector is assigned and subsequently identified by its time shifted PN short code. The time shifted PN short code, otherwise known as a PN short code phase offset, is measured from the absolute reference time. As long as the oscillating frequency of each BTS is maintained to be substantially equal to the system reference oscillating frequency, its associated PN short code time offset will remain constant and identifiable.

If the oscillating frequency of a BTS sector deviates from the system reference oscillating frequency, its associated PN short code time offset shifts, either up or down. Shifting the PN short code time offset from its assigned time offset may result in the inability of mobile station 103 to handoff a communication signal from a first to a second base transceiver station in wireless communication system 100.

Figure 2:
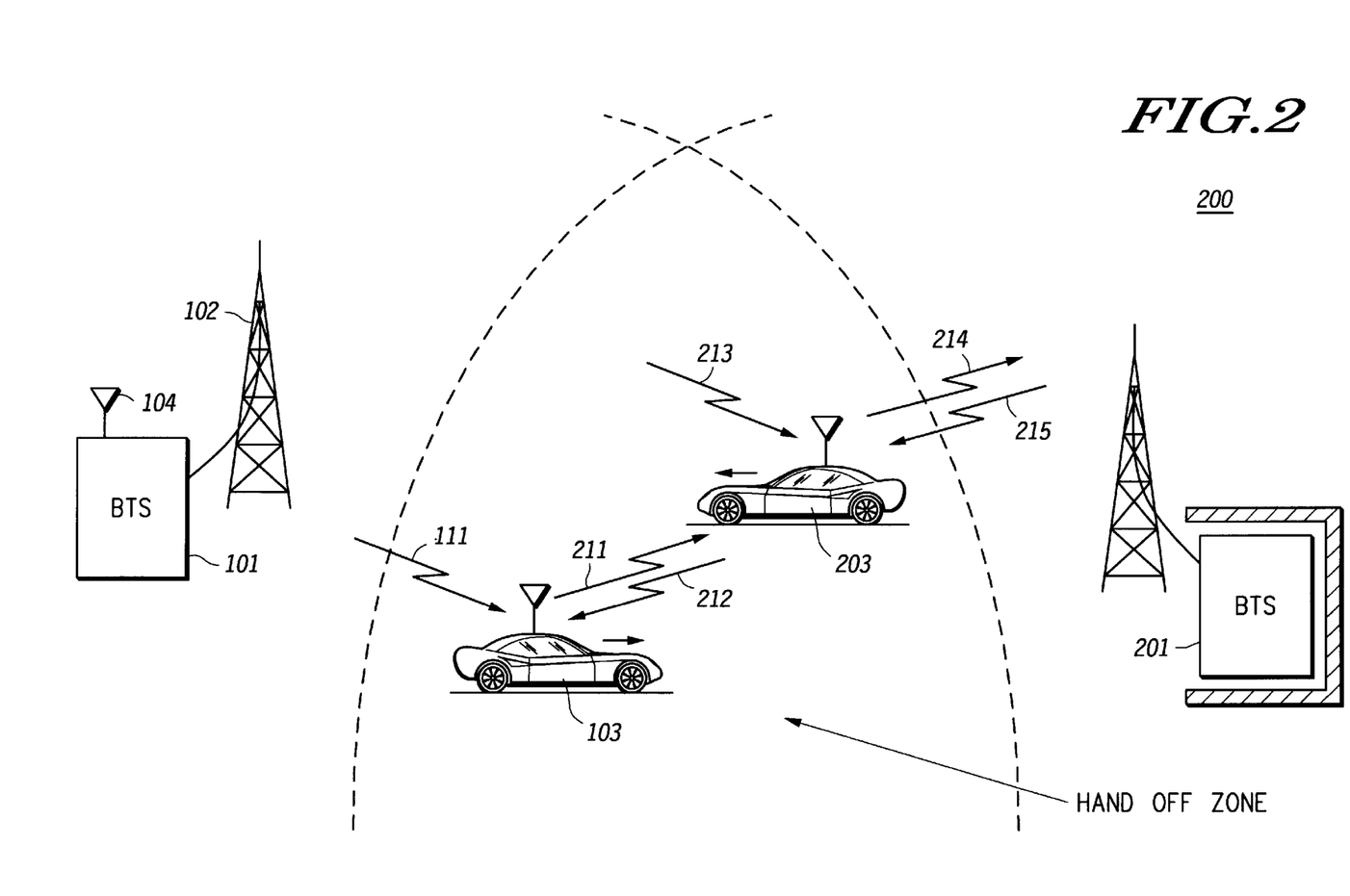
FIG. 2 is a random mobile station monitoring system for use in CDMA wireless communication system 1001 according to a preferred embodiment of the present invention.

FIG. 2 illustrates a random mobile station monitoring system for use in CDMA wireless communication system 100, generally designated as random mobile station system 200, according to a preferred embodiment of the present invention. For purposes of discussion, random mobile station monitoring system 200 includes a first base transceiver station (BTS) 101 synchronized to a system reference oscillator frequency and an absolute reference time via a GPS antenna 104, and a second BTS 201, unsynchronized to the system reference oscillator frequency and absolute reference time. Second BTS 201 may be remotely located, for example, in a subway tunnel. In addition, a first mobile station (MS) 103 and a second MS 203 is shown, although more mobile stations may be present.

MS 103 receives signaling, including pilot, paging and sync channels, from first BTS 101 via a forward link 111 transmitted from antenna 102, as well as from second BTS 201 via a forward link 212. Moreover, MS 103 communicates to BTS 201 via a reverse link 211 which includes messaging capability via an access channel. Similarly, MS 203 receives signaling, including pilot, paging and sync channels, from first BTS 101 via a forward link 213, as well as from second BTS 201 via a forward link 215. MS 203 also communicates to BTS 201 via a reverse link 214 which includes messaging capability via an access channel.

Figure 3:
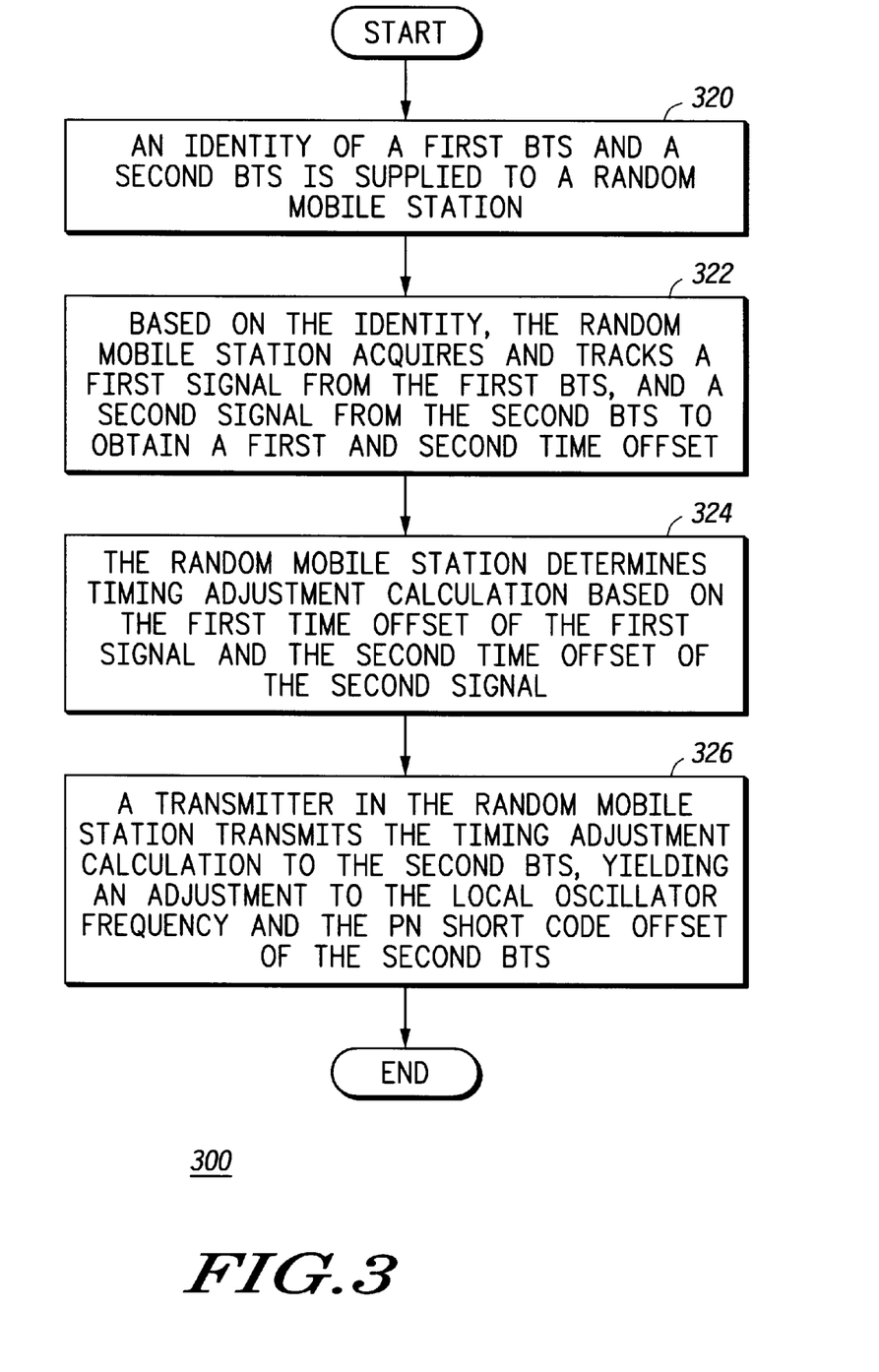
FIG. 3 is a flow chart of a method for providing time adjustment to wireless communication system 100, according to the preferred embodiment of the present invention.

FIG. 3 is a flow chart of a method 300 for providing time adjustment to wireless communication system 100, according to the preferred embodiment of the present invention. More specifically, in method 300, random mobile stations 103 and 203 provide the timing adjustment calculations necessary to adjust a local oscillator of second BTS 201 to the system reference oscillator frequency, time, date and year. Method 300 starts at block 320 where an identity of first BTS 101 and second BTS 201 is supplied to random mobile station 103. The identity includes a first base station identity number and a first PN short code time offset of the first base station transceiver, and a second base station identity number and a second PN short code time offset of the second base station transceiver, to the subscriber station.

Next, at block 322, based on the identity, random mobile station 103 acquires and tracks a first signal via forward link 111 from the first base transceiver station and a second signal via forward link 212 from the second base transceiver station by the mobile station, to obtain a corresponding first and second time offset. First, random mobile station 103 searches for and tracks the first signal by acquiring a pilot channel of the first signal from the first base station transceiver via correlation to a PN short code. Random mobile station 103 then decodes a sync channel of the first signal to verify the first PN short code time offset and the first base station identity number via coherent demodulation provided by the pilot signal. In addition, random mobile station 103 decodes a paging channel of the first signal to acquire a neighbor list comprised of PN short code time offsets associated with neighboring base station transceivers, including at least the second base station transceiver. Upon verification of the first PN short code time offset and the first base station identity number, random mobile station 103 enables a phase lock loop algorithm to begin adjusting its local oscillator frequency to synchronize to an oscillator frequency of the first base station transceiver. Concurrently, random mobile station 103 initiates a timer (not shown). Upon expiration of the timer, random mobile station 103 freezes the phase lock loop algorithm, thereby yielding a stable free running local oscillator frequency in mobile station 103 which is substantially equal to the oscillator frequency of the first base transceiver station. A random mobile station controller then extracts a first time offset from the first signal. Finally, random mobile station 103 terminates tracking of the first signal.

Second, random mobile station 103 searches for and tracks the second signal by acquiring a pilot channel of the second signal from the second base station transceiver via correlation to the PN short code. Random mobile station 103 then decodes a sync channel of the second signal to verify the second PN short code time offset and the second base station identity number via coherent demodulation provided by the pilot signal. In addition, random mobile station 103 may decode a paging channel of the second signal to acquire a neighbor list comprised of PN short code. time offsets associated with neighboring base station transceivers, including at least the first base station transceiver. Upon verification of the second PN short code time offset and the second base station identity number, random mobile station 103 enables a phase lock loop algorithm to begin adjusting its local oscillator frequency to synchronize to an oscillator frequency of the second base station transceiver. Concurrently, random mobile station 103 initiates its timer. Upon expiration of the timer, the random mobile station controller extracts a second time offset from the second signal.

At block 324, random mobile station 103 determines a timing adjustment calculation based on the first time offset of the first signal from the first base transceiver station and the second time offset of the second signal from the second base transceiver station. First, a controller in random mobile station 103 calculates a time offset difference between the first and second PN short code time offsets resulting from the identity, to form a desired time offset. The controller then calculates a difference between the first time offset and the second time offset to form a measured time offset. Finally, the controller compares the desired time offset to the measured time offset to determine a timing adjustment calculation.

At block 326, random mobile station 103 transmits the timing adjustment calculation to the second base station transceiver. Random mobile station 103 transmits the access channel message via reverse link 211 to second base transceiver station 201. The access channel message includes the timing adjustment calculation. In response to receipt of the access channel message containing the timing access message, second base transceiver station 201 adjusts its second time offset to be equivalent to the second PN short code time offset thereby yielding a PN short code time offset which is synchronized to the absolute reference time of the first base station. In addition, second base station transceiver station 201 adjusts its local oscillator frequency thereby yielding a local oscillator frequency in the second base station transceiver which is substantially equal to the system reference oscillator frequency of the first base station.

In an additional embodiment, second BTS 201 averages the timing adjustment calculation with a previous, or many previous timing adjustment calculations to form a new timing adjustment calculation. Subsequent adjustment to the second time offset is then performed based on the new timing adjustment calculation.

Furthermore, multiple phase lock loop algorithms may be utilized simultaneously. For example, random mobile station 103 may use two phase lock loop algorithms when tracking a first signal from first BTS 101 and a second signal from second BTS 201 simultaneously; the first phase lock loop algorithm locked to and tracking the first signal, and the second phase lock loop algorithm locked to and tracking the second signal.

Figure 4:
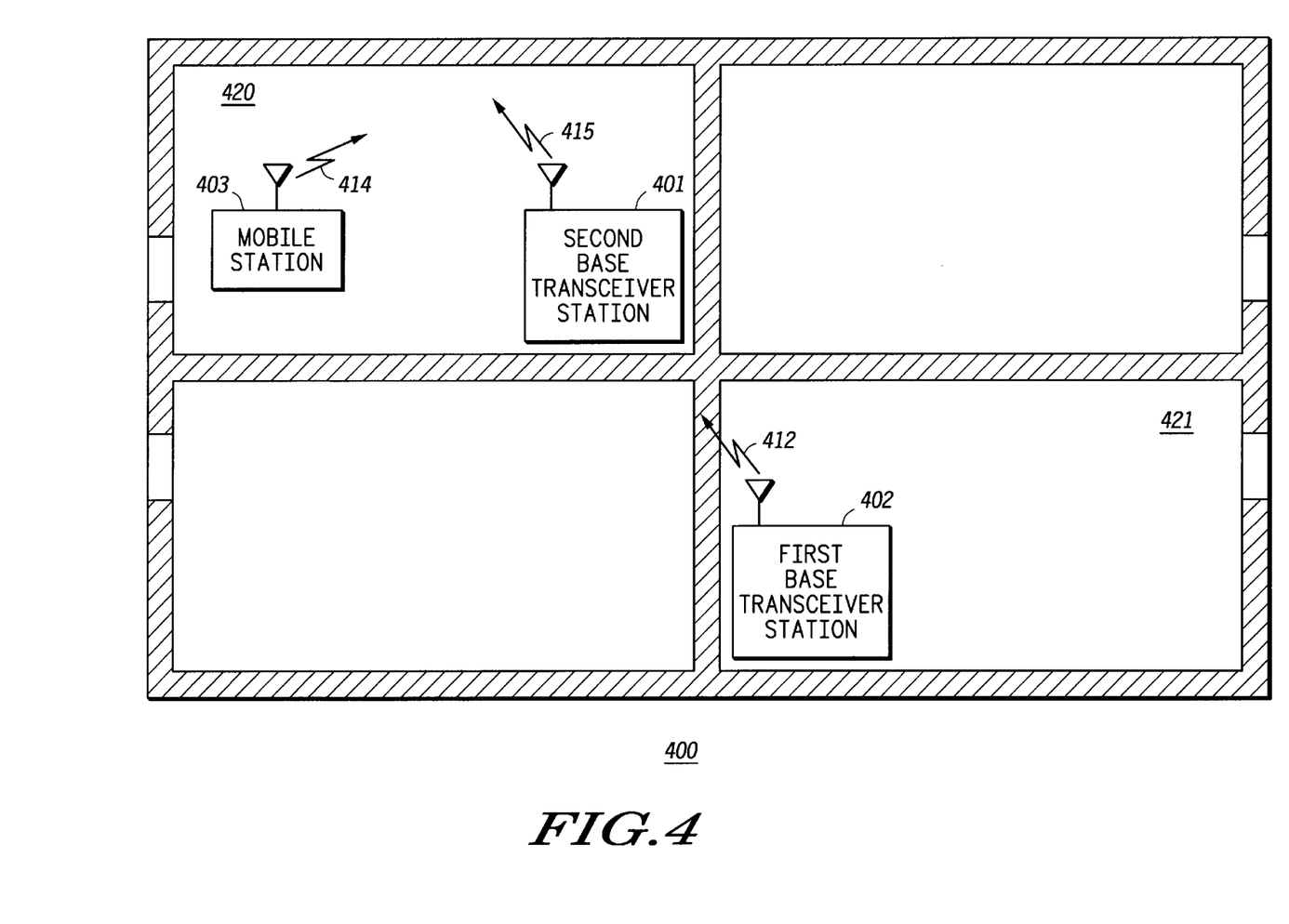
FIG. 4 is a mobile station monitoring system for use in a home base cordless phone system, according to an alternate embodiment of the present invention.

FIG. 4 is a mobile station monitoring system for use in a home base cordless phone system, generally designated home base cordless phone system 400, according to an alternate embodiment of the present invention. Home base cordless phone system 400 includes a includes a first base transceiver station 402 in communication with a mobile station (not shown) via a forward link 412 and a reverse link (not shown). Forward link 412 is used to transmit a first signal. First base transceiver station 402 is located in a first apartment 421. In addition, home base cordless phone system 400 includes a second base transceiver station 401 in communication with a mobile station 403 via a forward link 415 and a reverse link 414. Forward link 415 is used to transmit a second signal. Second base transceiver station 401 and mobile station 403 are located in a second apartment 420. Although, mobile station 403 is only in communication with second base transceiver station 401, it may also monitor signals transmitted from local base transceiver stations, for example, a signal transmitted on forward link 412 from first base transceiver station 402.

For purposes of discussion, first base transceiver station 402 and second base transceiver station 401 initially operate at different time offsets, herein designated as a first PN short code time offset and a second PN short code time offset. As a result of the different time offsets, the first signal transmitted on forward link 412 will not be an interferer to the second signal transmitted on forward link 415. However, due to environmental conditions, local oscillator frequency and accuracy, as well as the passage of time, the first and second PN short code time offset may begin to drift toward each other. Consequently, it is possible for the first signal transmitted on forward link 412 to interfere with the second signal transmitted on forward link 415.

Therefore, it is contemplated that the method for providing a time adjustment to a wireless communication system described in connection with FIG. 3 may be applied to home base cordless phone system 400. It will be further appreciated that a time adjustment to second base transceiver station 401 in home base cordless phone system 400, would be beneficial for the purpose of de-synchronizing adjacently located base transceiver stations, for example, first base transceiver station 402 and second base transceiver station 401. Since the wireless communication system depicted in FIG. 4 is a home base cordless phone system, mobile station 403 would transmit the timing adjustment calculation only to second BTS 101 via reverse link 414.

For example, in the case of the local oscillator of first BTS 402 operating at a faster speed than the local oscillator of second BTS 401, the timing adjustment calculation would direct second BTS 401 to increase its local oscillator frequency. Similarly, if the local oscillator of first BTS 402 operating at a slower speed than the local oscillator of second BTS 401, the timing adjustment calculation would direct second BTS 401 to decrease its local oscillator frequency. In addition, if the PN short code associated with first BTS 402 was within a few chips, for example, 2 chips, of aligning with the PN short code associated with second BTS 401, the timing adjustment calculation could be used to direct second BTS 401 to jump, for example, five chips in time. Thus, the desired result of keeping PN short code time offsets associated with neighboring base transceiver stations, such as those in home base cordless phone system 400, from getting to within a predetermined time offset difference, may be accomplished using the methods described in connection to FIG. 3, above.

In a further embodiment, it is contemplated that the timing adjustment calculation provided by random mobile stations may be replaced with timing adjustment calculation made by a fixed location monitoring mobile (FLMM) located between first BTS 101 and second BTS 201. The FLMM may be enabled as a customized mobile station mounted to a fixed location, which has as its primary function, the ability to synchronize unsynchronized base transceiver stations.

Figure 5:
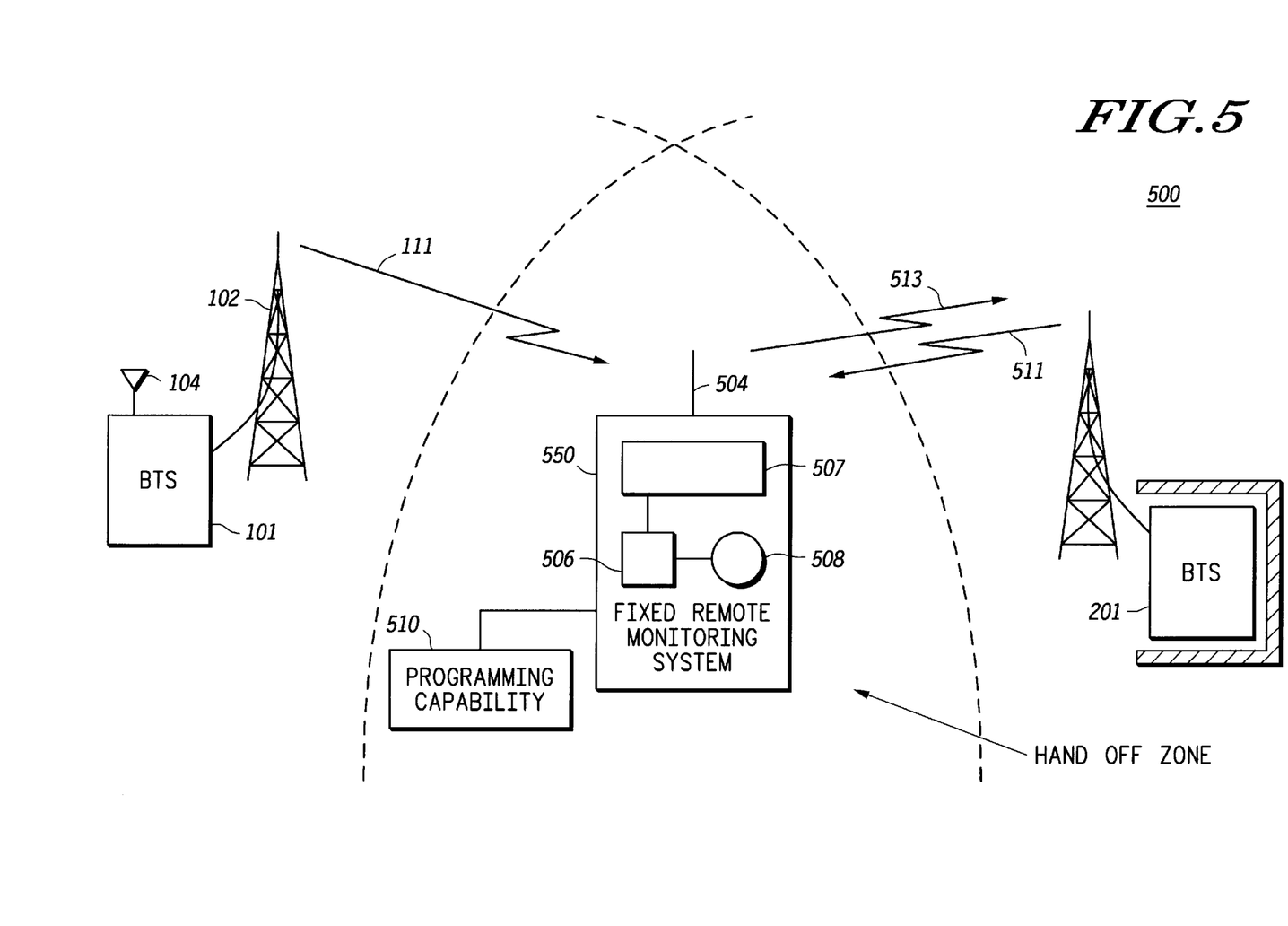
FIG. 5 is a fixed remote monitoring system for use in a wireless communication system, according to a further embodiment of the present invention.

FIG. 5 illustrates a fixed remote monitoring system for use in wireless communication system 100, according to the further embodiment of the present invention. Fixed remote monitoring system 200 includes a first base transceiver station (BTS) 101 synchronized to system reference time, and a second BTS 201, unsynchronized to the system reference time. System reference time includes a system reference oscillating frequency and an associated absolute reference time derived from GPS time via received at first BTS 101 via GPS antenna 104. Second BTS 201 may be remotely located, for example, in a subway tunnel. In addition, a subscriber station, for example a fixed location monitoring mobile (FLMM) 400 (discussed further in connection with FIGS. 5 and 6), is shown.

FLMM may be enabled as a customized mobile station mounted to a fixed location, which has as its primary function, the ability to synchronize unsynchronized base transceiver stations. FLMM 550 includes a FLMM antenna 504 for transmitting and receiving wireless communication signals on forward and reverse links 111, 511, and 513, a receiver for decoding received signals, a FLMM controller 506, and a timer 508 responsive to controller 506. FLMM 550 is strategically located to allow communication with first BTS 101 and second BTS 201. FLMM 550 receives signaling, including pilot, paging and sync channels, from first BTS 101 via a forward link 111. Similarly, FLMM 550 receives signaling, including pilot, paging and sync channels, from second BTS 201 via a forward link 511. Moreover, FLMM 550 communicates to BTS via a reverse link 513 which includes messaging capability through an access channel, and voice and data capability through a traffic channel.

Figure 6:
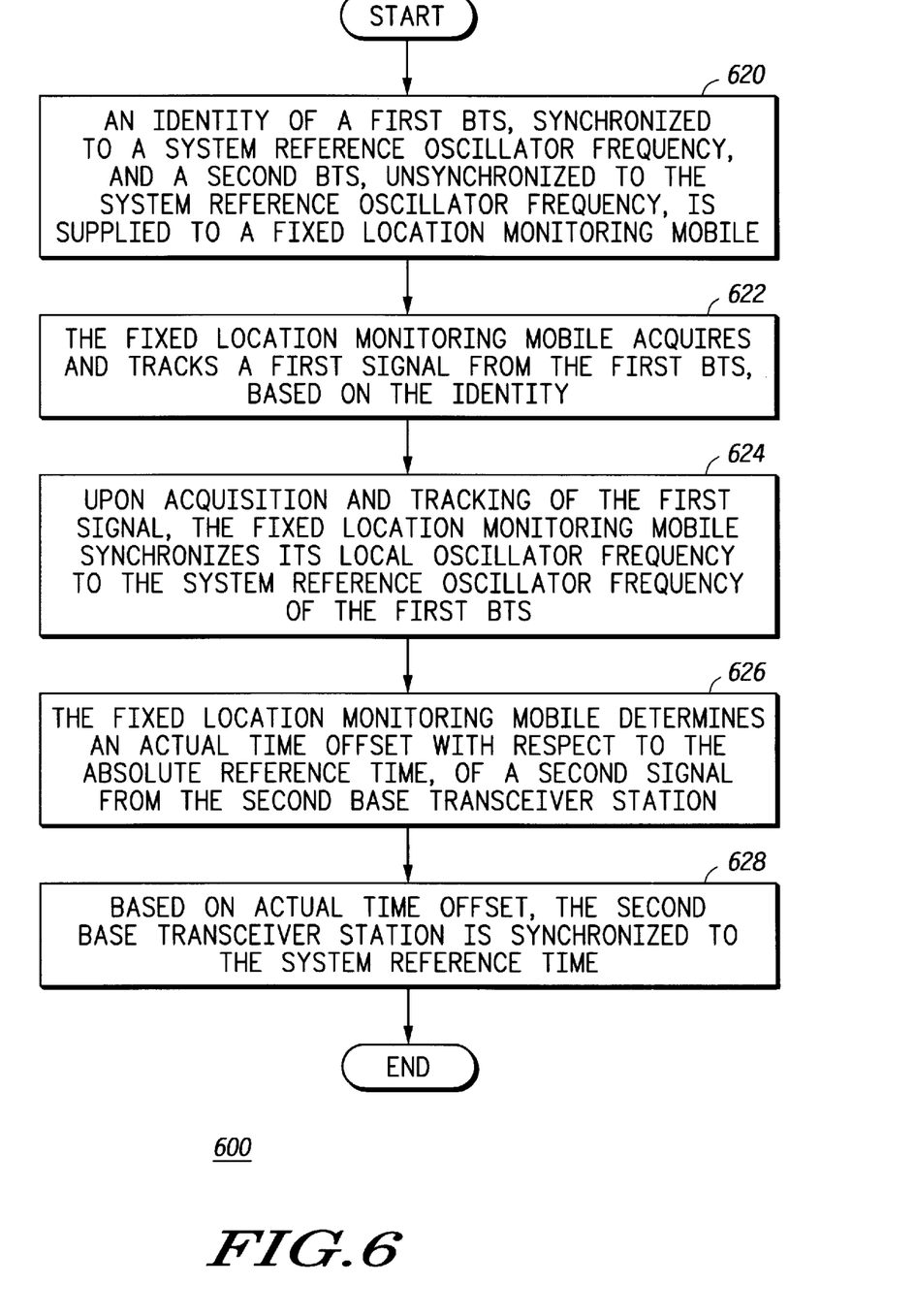
FIG. 6 is a flow chart of a method for providing a time adjustment to CDMA wireless communication system 100, according to the further embodiment of the present invention.

FIG. 6 is a flow chart of a method 600 for providing wireless communication system synchronization to an unsynchronized base transceiver station, according to the further embodiment of the present invention. More specifically, in method 600, a fixed location monitoring mobile (FLMM) 400 coordinates the steps necessary to provide the system reference time to second BTS 201.

Method 600 starts at block 620 where an identity of first BTS 101 and second BTS 201 is supplied to FLMM 550. The identity includes an identity number, and PN short code time offset associated with first BTS 101. The identity also includes a distance between BTS 101 and FLMM 550. Similarly, the identity includes an identity number, and PN short code time offset associated with second BTS 201, as well as its distance from FLMM 550. The identity may be provided to FLMM 550 in a number of ways. For example the identity may be provided by a database load to FLMM 550 via over-the-air messaging or it may be provided by a programming capability 510 connected directly to FLMM 550.

Next, at block 622, FLMM 550 acquires a first signal from first BTS 101, based on the identity. The first signal includes a pilot channel specific to first base site 101 which is used by FLMM 550 to acquire synchronization with first base site 101. The first signal also includes a sync channel which when demodulated and decoded, provides the time of first BTS's 101 pilot PN offset with respect to system reference time. The first signal further includes a paging channel which, among other things, transmits messages including neighbor lists of pilot PN offsets. Additionally, a two way traffic channel is provides via forward link 111 and a reverse link (not shown). The pilot channel functions to provide a coherent time reference for sync, paging and traffic channels.

Acquisition and tracking of the first signal by FLMM 550 is as follows. First, FLMM 550 scans for a pilot channel associated with the first signal transmitted on forward link 111 via correlation in the time domain to the PN short code. Upon correlation, a sync channel associated with the first signal transmitted, is decoded via a receiver 507 in FLMM 550 in order to verify the assigned PN short code time offset (a.k.a. the time of the BTS's PN offset with respect to system time) as well as the identity number of first BTS 101. After FLMM 550 decodes the sync channel associated with first BTS 101, a pilot searcher in FLMM receiver 507 may continue to track the pilot channel while maintaining the oscillating frequency and absolute reference time of first BTS 101.

FLMM 550 may search through one or more pilot channels associated with neighboring BTSs, prior to correlating the pilot channel and decoding the sync channel associated with the first signal transmitted by BTS 101. In addition, FLMM 550 may verify the identity number of first BTS 101 as well as acquire a neighbor list comprised of neighboring PN short code offsets, via decoding a paging channel associated with the first signal transmitted on forward link 111.

Upon tracking a signal associated with first BTS 101, FLMM 550 synchronizes its local oscillator frequency to the system reference oscillator frequency of first BTS 101, at block 624. In addition, FLMM 550 also sets its local time, date and year to synchronize with respect to the absolute reference time of first BTS 101. Prior to decoding the sync channel associated with the first signal transmitted by first BTS 101, FLMM 550 is not synchronized to any particular time, date and year. Moreover, the FLMM's 400 local oscillator is not synchronized to any particular BTS local oscillator frequency. Synchronization begins by enabling a phase lock loop algorithm (not shown) in FLMM 550 to begin adjusting its local oscillator frequency to synchronize to the system reference oscillator frequency of first BTS 101. Consequent to enablement of the phase lock loop algorithm, a timer 508 in FLMM 550, is initiated via a FLMM controller 506. Timer 508 monitors a preset time interval, which when initiated, allows enough time for synchronization to take place between FLMM 550 and first BTS 101. Upon expiration of timer 508, FLMM controller 506 freezes the phase lock loop algorithm, thereby yielding a stable free running local oscillator frequency in FLMM 550 which is substantially equal to the system reference oscillator frequency of first BTS 101, without continuing to track the first signal.

Next, at block 626, FLMM determines an actual time offset with respect to the absolute reference time, of a second BTS 201. Second 201 is not synchronized to the system reference time. First FLMM 550 acquires a second signal from second BTS 201, based on the identity or the neighbor list resulting from demodulating the paging channel associated with the first signal. The second signal includes a pilot channel specific to second base site 201 and used by FLMM 550 to acquire synchronization with second base site 201. The second signal also includes a sync channel which when demodulated and decoded, provides the time of second BTS's 201 pilot PN offset with respect to system reference time. The second signal further includes a paging channel which, among other things, transmits messages including neighbor lists of pilot PN offsets. Additionally, a two way traffic channel is provides via forward link 511 and reverse link 513.

Acquisition and tracking of the second signal by FLMM 550 is substantially similar to the acquisition and tracking of the first signal described in connection with block 622 (above). Thus after verification of acquisition of the second signal, decoding a sync channel associated with the second signal transmitted on forward link 511, yields an actual time offset associated with second base transceiver station 201. The actual time offset is then extracted by FLMM controller 506. Due to environmental conditions etc., FLMM 550 may have to iterate through, or search, multiple pilot/sync channel signals associated with neighboring BTSs in order to locate the identity number associated with second BTS 201. Once decoded, FLMM controller 506 extracts an actual time offset for use in subsequent calculation described in connection with block 628 (below).

Lastly, at block 628, FLMM 550 synchronizes second BTS 201 to the system reference oscillator frequency and absolute reference time as follows. First, FLMM controller 506 calculates a time offset difference between the first and second PN short code time offsets supplied via the identity, to form a desired time offset. It then calculates a difference between the actual time offset of second BTS 201 and the desired time offset, to form an timing adjustment calculation. In addition, FLMM controller 506 calculates a difference in time between the absolute reference time and the time, date and year of second BTS 201.

FLMM controller 506 calculations by are done in chips wherein multiples of 64 chips correspond to a PN offset. For example, a PN offset of 1 corresponds to the pseudorandom noise sequence, shifted 64 chips from an absolute time offset, while a PN offset of 2 corresponds to the pseudorandom noise sequence, shifted 128 chips from an absolute time offset.

An access channel signal carried on reverse link 513, including a timing measurement message, is subsequently sent by FLMM 550 to second BTS 201 in order to make the appropriate adjustments as follows. First, the timing adjustment calculation is used in a phase lock loop algorithm of second BTS 201. The phase lock loop algorithm then outputs a correction signal to the local oscillator of second BTS 210 to adjust its local oscillator frequency to be substantially equal to the system reference oscillator frequency of the first base station. In addition, the correction signal is used to adjust the time, date, and year of second BTS 201 such that the time, date, and year are synchronized to the absolute reference time of first BTS 101.

In order to transmit the message in the access channel signal on reverse link 513, FLMM 550 must first tune its local oscillator frequency to match the local oscillator frequency of second BTS 201. FLMM 550 accomplishes the tuning via enabling its phase lock loop algorithm to begin adjusting its local oscillator frequency to synchronize to the actual time offset of second BTS 201. Once synchronized, FLMM 550 can enable access channel messaging to second BTS 201. As a result, the timing measurement message is used by second BTS 201 to correct, or synchronize its local oscillator, time, date and year to the system reference oscillator frequency and absolute reference time.

Although only one unsynchronized BTS, second BTS 201, is discussed in connection with FIGS. 5 and 6, it is possible to have more than one unsynchronized BTS in wireless communication system 100. In the case of multiple unsynchronized BTSs, multiple FLMMs, one between each pair of unsynchronized BTSs, may be used to relay synchronization messaging between the unsynchronized BTSs. Accordingly, if one BTS is synchronized to the system reference oscillator frequency and system reference time, unsynchronized BTSs in wireless communication system 100 may be synchronized using the method described in FIG. 6.

Additionally, a pilot searcher algorithm (not shown) in FLMM controller 506 may be used for time synchronization of FLMM 550 to first BTS 101 as follows. First, verification of receipt of the first signal transmitted on forward link 111 is performed via decoding its sync channel. Second, FLMM 550 uses the pilot searcher algorithm to control adjustment of its phase lock loop algorithm such that its local oscillator frequency is substantially equal to the system reference oscillator frequency of first BTS 101. Concurrently, FLMM 550 acquires the second signal transmitted on forward link 511 from second BTS 201, and based on timing adjustment calculations (discussed above) synchronizes second BTS 201.

Although substantially similar, the further embodiment which utilizes the FLMM, as compared with the preferred embodiment which utilizes random mobile stations, has some differences as follows. When using the FLMM, distance measurements to first BTS 101 and second BTS 201 may be used by the FLMM to improve accuracy of the timing adjustment calculation. For example, if the FLMM is one kilometer from first BTS 101 and 2 kilometers from second BTS 201, and first BTS 101 and second BTS 201 are synchronized in time, a first and second signal sent simultaneously from first and second BTS 101 and 201 will arrive 3.3 microseconds apart. The difference in time of arrival between the first and second signal, coupled with possible multipath propagation delays, may be used in calculating the timing adjustment calculation.

Second, a random mobile station may be in an active call and consequently, use a traffic channel for messaging and synchronization measurements. The FLMM will not necessarily utilize a traffic channel. Third, a mobile station controller in a random mobile station could limit time channel access messages for the purpose of time adjustment to one per random handoff from first BTS 101 and second BTS 102 or vice versa, whereas the FLMM could channel access messages at predetermined intervals. Lastly, the preferred embodiment provides for multiple timing adjustment calculations which, when averaged, are used to adjust the local oscillator frequency, time, date and year in second BTS 201. In the alternate embodiment, a discrete timing adjustment calculation based on the actual offset of second BTS 201 is used to adjust the local oscillator frequency, time, date and year in second BTS 201.

The IS-95A forward link channel and mobile station and its application in wireless CDMA systems has been specifically referred to herein, but the present invention is applicable to any digital link, including but not limited to the reverse link IS-95A channel, all wideband forward and reverse link channels and to all forward- and reverse-link TDMA channels, in all TDMA systems such as Groupe Special Mobile (GSM), a European TDMA system, Pacific Digital Cellular (PDC), a Japanese TDMA system, and Interim Standard 54 (IS-54), a U. S. TDMA system.

The principles of the present invention which apply to a cellular-based digital communication system, include but are not limited to personal communicating systems, trunked systems, satellite systems and data networks. Likewise, the principles of the present invention which apply to all types of digital radio frequency channels also apply to other types of communication channels, such as radio frequency signaling channels, electronic data buses, wireline channels, optical fiber links and satellite links.

It will furthermore be apparent that other forms of the invention, and embodiments other than the specific embodiments described above, may be devised without departing from the spirit and scope of the appended claims and their equivalents.

What we claim is:

1. In a wireless communication system, comprising at least a first and a second base transceiver station, a method for providing a time adjustment to the second base transceiver station, the method comprising the steps of:

receiving an identity of the first and second base transceiver station at a mobile station, wherein the step of receiving the identity comprises the step of receiving a first base station identity number and a first PN short code time offset of the first base station transceiver, and a second base station identity number and a second PN short code time offset of the second base station transceiver, wherein the second base station transceiver adjusts a timing such that the second base station transceiver is synchronized in time to the first base station transceiver;

tracking a first signal from the first base transceiver station and a second signal from the second base transceiver station by the mobile station, based on the identity, to yield a first and second time offset wherein the step of tracking the first signal by the mobile station comprises the steps of:

acquiring a pilot channel of the first signal from the first base station transceiver via correlation to a PN short code by the mobile station;

decoding a sync channel of the first signal to verify the first PN short code time offset and the first base station identity number via coherent demodulation provided by the pilot signal;

decoding a paging channel of the first signal to acquire a neighbor list comprised of PN short code time offsets associated with neighboring base station transceivers, including at least the second base station transceiver;

enabling a phase lock loop algorithm in the mobile station to begin adjusting a local oscillator frequency of the mobile station to synchronize to an oscillator frequency of the first base station transceiver;

initiating a timer in the mobile station upon enabling the phase lock loop algorithm;

freezing the phase lock loop algorithm upon expiration of the timer, thereby yielding a stable free running local oscillator frequency in the mobile station which is substantially equal to the oscillator frequency of the first base transceiver station;

extracting a first time offset from the first signal by a mobile station controller; and terminating tracking of the first signal by the mobile station;

determining a timing adjustment calculation based on the first time offset of the first signal and the second time offset of the second signal by the mobile station; and transmitting the timing adjustment calculation to the second base station transceiver.

2. The method according to claim 1, wherein the mobile station is a random mobile station comprising a mobile station controller for calculating a timing adjustment calculation.

3. The method according to claim 1, wherein the step of tracking the second signal by the mobile station comprises the steps of:
  acquiring a pilot channel of the second signal from the second base station transceiver via correlation to the PN short code by the mobile station;
  decoding a sync channel of the second signal to verify the first PN short code time offset and the second base station identity number via coherent demodulation provided by the pilot signal; and
  decoding a paging channel of the second signal to acquire a neighbor list comprised of PN short code time offsets associated with neighboring base station transceivers, including at least the first base station transceiver.

4. The method according to claim 3, wherein the step of tracking the second signal further comprises the steps of:
  enabling the phase lock loop algorithm of the mobile station to begin adjusting a local oscillator frequency of the mobile station to synchronize to an oscillator frequency of the second base station transceiver; and
  extracting a second time offset from the second signal by a mobile station controller.

5. The method according to claim 4, wherein the step of determining a timing adjustment calculation based on the first time offset of the first signal and the second time offset of the second signal comprises the steps of:
  calculating a time offset difference between the first and second PN short code time offsets to form a desired time offset;
  calculating a time offset difference between the first time offset and the second time offset to form a measured time offset; and
  comparing the desired time offset to the measured time offset by the mobile station controller to determine the timing adjustment calculation.

6. The method according to claim 5, wherein the step of transmitting the timing adjustment calculation to the second base station transceiver comprises the steps of:
  transmitting an access channel message to the second base transceiver station, the access channel message comprising the timing adjustment calculation;
  receiving the channel access message by the second base station receiver; and
  adjusting, based on the timing adjustment calculation, the second time offset to be equivalent to the second PN short code time offset thereby yielding a PN short code time offset in the second base transceiver station which is synchronized to the PN short code time offset of the first base station.

7. The method according to claim 5, wherein the step of transmitting the timing adjustment calculation to the second base station transceiver further comprises the steps of:
  transmitting an access channel message to the second base transceiver station, the access channel message including the timing adjustment calculation;
  averaging, in the second base transceiver station, the timing adjustment calculation with a previous timing adjustment calculation to form a new timing adjustment calculation; and
  adjusting, based on the new timing adjustment calculation, the second time offset to be equivalent to the second PN short code time offset thereby yielding a PN short code time offset in the second base transceiver station which is synchronized to the PN short code time offset of the first base station.

8. The method according to claim 6, wherein the step of transmitting the access channel message further comprises the steps of:
  enabling the phase lock loop algorithm in the mobile station to begin adjusting its local oscillator frequency to synchronize to the local oscillator frequency of the second base station transceiver; and
  synchronizing the mobile station to the second time offset to enable access channel messaging.

9. The method according to claim 1, wherein the wireless communication system is a home base cordless phone system comprising a plurality of base transceiver stations including at least the first and second base transceiver stations.

10. The method according to claim 1, wherein the wireless communication system comprises a code division multiple access system.

11. In a wireless communication system, comprising at least a first and a second base transceiver station, a method for providing a time adjustment to the second base transceiver station, the method comprising the steps of:
  receiving an identity of the first and second base transceiver station at a mobile station, wherein the step of receiving the identity comprises the step of receiving a first base station identity number and a first PN short code time offset of the first base station transceiver, and a second base station identity number and a second PN short code time offset of the second base station transceiver, wherein the second base station transceiver adjusts a timing such that the second base station transceiver is unsynchronized in time to the first base station transceiver;
  tracking a first signal from the first base transceiver station and a second signal from the second base transceiver station by the mobile station, based on the identity, to yield a first and second time offset, wherein the step of tracking the first signal by the mobile station comprises the steps of:
  acquiring a pilot channel of the first signal from the first base station transceiver via a first signal strength measurement and correlation to a PN short code time offset by the mobile station;
  decoding a sync channel of the first signal to verify the first base station identity number via coherent demodulation provided by the pilot signal;
  enabling a phase lock loop algorithm in the mobile station to begin adjusting a local oscillator frequently of the mobile station to synchronize to an oscillator frequency of the first base station transceiver;
  initiating a timer in the mobile station upon enabling the phase lock loop algorithm;
  freezing the phase lock loop algorithm upon expiration of the timer, thereby yielding a stable free running local oscillator frequency in the mobile station which is substantially equal to the oscillator frequency of the first base transceiver station;
  extracting a first time offset from the first signal by a mobile station controller; and
  terminating tracking of the first signal by the mobile station;
  determining a timing adjustment calculation based on the first time offset of the first signal and the second time offset of the second signal by the mobile station; and
  transmitting the timing adjustment calculation to the second base station transceiver.

12. The method according to claim 11, wherein the step of tracking the second signal by the mobile station comprises the steps of:

acquiring a pilot channel of the second signal from the first base station transceiver via second signal strength measurement and correlation to the PN short code time offset by the mobile station; and decoding a sync channel of the second signal by the mobile station to verify the second base station identity number via coherent demodulation provided by the pilot signal.

13. The method according to claim 10, wherein the step of tracking the second signal further comprises the steps of:

enabling the phase lock loop algorithm in the mobile station to begin adjusting the local oscillator frequency of the mobile station to synchronize to a oscillator frequency of the second base station transceiver; and extracting a second time offset from the second signal by a mobile station controller.

14. The method according to claim 13, wherein the step of determining the timing adjustment calculation based on the first time offset of the first signal and the second time offset of the second signal comprises the steps of:

calculating a time offset difference between the first and second PN short code time offsets to form a desired time offset;

calculating a time offset difference between the first time offset and the second time offset to form a measured time offset; and comparing the desired time offset to the measured time offset by the mobile station controller to form the timing adjustment calculation.

15. The method according to claim 14, wherein the step of transmitting the timing adjustment calculation to the second base station transceiver comprises the steps of:

transmitting an access channel message to the second base transceiver station, the access channel message including the timing adjustment calculation;

receiving the access channel message by the second base transceiver station; and adjusting, based on the access channel message, the second time offset to prevent alignment in time of the second time offset with the first time offset.

16. The method according to claim 15, wherein the step of adjusting further comprises the step of:

adjusting, based on the access channel message, the oscillator frequency of the second base station transceiver, to prevent alignment in time of the second time offset with the first time offset.

17. In a wireless communication system, comprising at least a first and a second base transceiver station, the first base transceiver station synchronized to a system reference time, and the second base transceiver station unsynchronized to the system reference time, the system reference time including a system reference oscillator frequency and an absolute reference time, a method for providing wireless communication system synchronization to the second base transceiver station, the method comprising the steps of:

receiving an identity of the first and second base transceiver station at a mobile station, wherein the step of receiving the identity comprises the steps of:

receiving a first base station identity number and a first PN short code time offset of the first base station transceiver;

receiving a second base station identity number and a second PN short code time offset of the second base station transceiver;

receiving a first distance between the first base transceiver station and the mobile station, and;

receiving a second distance between the second base transceiver station and the mobile station;

tracking a first signal from the first base transceiver station by the mobile station, based on the identity;

synchronizing the mobile station to the system reference time via the first signal;

determining an actual time offset with respect to the absolute reference time, of a second signal from the second base transceiver station by the mobile station; and based on the actual time offset, synchronizing the second base transceiver station to the system reference time.

18. The method according to claim 17, wherein the step of receiving the identity further comprises the step of receiving a first distance between the first base transceiver station and the mobile station and a second distance between the second base transceiver station and the mobile station.

19. The method according to claim 17, wherein the step of tracking the first signal by the mobile station comprises the steps of:

acquiring a pilot channel of the first signal from the first base station transceiver via correlation to a PN short code by the mobile station;

decoding a sync channel of the first signal by the mobile station to verify the first PN short code time offset and the first base station identity number via coherent demodulation provided by the pilot signal; and decoding a paging channel of the first signal to acquire a neighbor list comprised of PN short code time offsets associated with neighboring base station transceivers, including at least the second base station transceiver.

20. The method according to claim 17, wherein the step of synchronizing the mobile station to the system reference time via the first signal comprises the steps of:

enabling a phase lock loop algorithm in the mobile station to begin adjusting its local oscillator frequency to synchronize to the system reference oscillator frequency of the first base station transceiver;

initiating a timer in the mobile station upon enabling the phase lock loop algorithm;

freezing the phase lock loop algorithm upon expiration of the timer, thereby yielding a stable free running local oscillator frequency in the mobile station which is substantially equal to the system reference oscillator frequency of the first base transceiver station; and terminating tracking of the first signal by the mobile station.

21. The method according to claim 17, wherein the step of synchronizing the mobile station to the system reference time via the first signal comprises the steps of:

initiating a pilot searcher algorithm in the mobile station to control adjustment of a phase lock loop algorithm of the mobile station such that the local oscillator frequency of the mobile station is substantially equal to the system reference oscillator frequency of the first base transceiver station; and continuing tracking of the first signal by the mobile station.

22. The method according to claim 17, wherein the step of determining an actual time offset with respect to the absolute reference time of the second signal comprises the steps of:

tracking the second signal from the second base transceiver station by the mobile station based on the identity of the second base station transceiver; and extracting the actual time offset from the second signal by a mobile station controller.

23. The method according to claim 22, wherein the step of tracking the second signal further comprises the steps of:
assigning a receiver in the mobile station to demodulate at least one signal at the second PN short code time offset;
acquiring a pilot channel of the at least one signal via correlation to a PN short code by the mobile station;
decoding a sync channel of the at least one signal by the mobile station to verify the second PN short code time offset and the second base station identity number via coherent demodulation provided by the pilot signal; and
verifying acquisition of the at least one signal by the receiver, based in the identity.

24. The method according to claim 23 wherein the mobile station is a fixed location monitoring mobile at a fixed location for synchronizing the second base transceiver station.

25. The method according to claim 24, wherein the step of synchronizing the second base transceiver station to the system reference time comprises the steps of:
calculating a time offset difference between the first and second PN short code time offsets to form a desired time offset;
calculating a difference between the actual time offset and the desired time offset of the second base transceiver station, by the mobile station controller to form a timing adjustment calculation;
transmitting an access channel message to the second base transceiver station, the access channel message comprising the timing adjustment calculation;
adjusting, based on the timing adjustment calculation, the actual time offset to be equivalent to the second PN short code time offset thereby yielding a PN short code time offset which is synchronized to the absolute reference time of the first base station; and
adjusting, based on the timing adjustment calculation, the local oscillator frequency of the second base transceiver station thereby yielding a local oscillator frequency in the second base station transceiver which is substantially equal to the system reference oscillator frequency of the first base station.

26. The method according to claim 25, wherein the step of transmitting the access channel message further comprises the steps of:
enabling a phase lock loop algorithm in the mobile station to begin adjusting its local oscillator frequency to synchronize to the local oscillator frequency of the second base station transceiver; and
synchronizing the fixed location monitoring mobile to the actual time offset to enable access channel messaging.

27. In a wireless communication system, comprising at least a first and a second base transceiver station, the first base transceiver station synchronized to a system reference time, and the second base transceiver station unsynchronized to the system reference time, the system reference time including a system reference oscillator frequency and an absolute reference time, an apparatus for providing wireless communication system synchronization to the second base transceiver station, the apparatus comprising:
means for conveying an identity of the first and second base transceiver station;
a mobile station adapted to receive the identity, the mobile station comprising
a mobile station receiver adapted to track a first signal from the first base transceiver station and a second signal from the second base transceiver station, based on the identity, and to synchronize the mobile station to the system reference time via the first signal, wherein the mobile station receiver further comprises:
means for acquiring a pilot channel of the second signal from the second base station transceiver via correlation to a short code; and
means for decoding a sync channel of the second signal to verify the first PN short code time offset and the second base station identity number via coherent demodulation provided by the pilot signal; and
a mobile station controller adapted to determine an actual time offset with respect to the absolute reference time, of the second signal, calculate a timing adjustment calculation based on the actual time offset, and coordinate transmission of an access channel message, the access channel message comprising the timing adjustment calculation;
a second base transceiver station receiver for reeving and acknowledging the access channel message; and
a second base transceiver station phase lock loop algorithm for producing a correction signal based on the timing adjustment calculation, the correction signal synchronizing the second base transceiver station to the system reference time.

28. In a wireless communication system, comprising at least a first and a second base transceiver station, the first base transceiver station synchronized to a system reference time, and the second base transceiver station unsynchronized to the system reference time, the system reference time including a system reference oscillator frequency and an absolute reference time, an apparatus for providing wireless communication system synchronization to the second base transceiver station, the apparatus comprising:
a means for conveying an identity of the first and second base transceiver station;
a mobile station for receiving the identity, the mobile station comprising
a mobile station receiver for tracking a first signal from the first base transceiver station and a second signal from the second base transceiver station, based on the identity, and
synchronizing the mobile station to the system reference time via the first signal,
a mobile station controller for determining an actual time offset with respect to the absolute reference time, of the second signal,
calculating an timing adjustment calculation based on the actual time offset, and
coordinating transmission of an access channel message the access channel message comprising the timing adjustment calculation;
a second base transceiver station receiver for receiving and acknowledging the access channel message; and
a second base transceiver station phase lock loop algorithm for producing a correction signal based on the timing adjustment calculation, the correction signal synchronizing the second base transceiver station to the system reference time.

29. The apparatus according to claim 26, wherein the identity comprises a first base station identity number and a first PN short code time offset of the first base station transceiver, and a second base station identity number and a second PN short code time offset of the second base station transceiver.

30. The apparatus according to claim 26, wherein the mobile station receiver further comprises:

a means for acquiring a pilot channel of the second signal from the second base station transceiver via correlation to a short code; and a means for decoding a sync channel of the second signal to verify the first PN short code time offset and the second base station identity number via coherent demodulation provided by the pilot signal.

31. The apparatus according to claim 19, wherein the mobile station receiver comprises:

a means for acquiring a pilot channel of the first signal from the first base station transceiver via correlation to a short code;

a means for decoding a sync channel of the first signal to verify the first PN short code time offset and the first base station identity number via coherent demodulation provided by the pilot signal; and a means for decoding a paging channel of the first signal to acquire a neighbor list comprised of PN short code offsets associated with neighboring base station transceivers, including at least the second base station transceiver.

* * * * *